(12) United States Patent
Nemie, Jr.

(10) Patent No.: US 6,474,445 B2
(45) Date of Patent: Nov. 5, 2002

(54) PRECISION NON-CONTAMINATION OILER

(75) Inventor: Edward J. Nemie, Jr., Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/102,864

(22) Filed: Mar. 22, 2002

(65) Prior Publication Data

US 2002/0100640 A1 Aug. 1, 2002

Related U.S. Application Data

(62) Division of application No. 09/518,170, filed on Mar. 2, 2000, now Pat. No. 6,340,241.

(51) Int. Cl.[7] .............................................. F16N 21/00
(52) U.S. Cl. .................................................. 184/105.3
(58) Field of Search ........................... 184/105.1, 105.2, 184/105.3; 137/318; 141/346

(56) References Cited

U.S. PATENT DOCUMENTS

| | | |
|---|---|---|
| 1,444,235 A | 2/1923 | Colgan |
| RE15,675 E | 8/1923 | Skelly |
| 1,692,320 A | 11/1928 | Zerk |
| 1,802,523 A | 4/1931 | Morangier |
| 1,833,402 A | 11/1931 | Mundis |
| 2,583,457 A * | 1/1952 | Woodall ...................... 118/267 |
| 4,165,769 A | 8/1979 | Hoffmann .................... 141/198 |
| 5,048,578 A | 9/1991 | Dorf et al. ................... 137/346 |
| 5,546,979 A | 8/1996 | Clark, II et al. ............. 137/318 |
| 5,975,164 A | 11/1999 | Whaley et al. .............. 141/351 |
| 6,105,725 A * | 8/2000 | Williams ..................... 184/102 |
| 6,199,578 B1 | 3/2001 | Clark, II ...................... 137/318 |

* cited by examiner

Primary Examiner—David Fenstermacher

(57) ABSTRACT

An apparatus for lubricating a surface. The apparatus includes a cylinder having an interior wall extending longitudinally therethrough. The wall defines an opening. The apparatus also includes a lubricating fluid reservoir located upstream from the opening and a path of fluid communication fluidly connecting the reservoir and the opening. The apparatus also includes a valve located in the path of fluid communication. The valve is biased to close the path of fluid communication. At least one valve opening member is disposed in the opening, with the at least one valve opening member operatively connected to the valve. A surface to be lubricated is insertable into the opening such that the surface engages the at least one valve opening member. The at least one valve opening member opens the valve, allowing the fluid to flow downstream from the reservoir, through the path of fluid communication and to the opening to the surface to be lubricated. A method of lubricating the surface is also disclosed.

11 Claims, 4 Drawing Sheets

PRECISION NON-CONTAMINATION OILER

The present application is a divisional application filed pursuant to 35 U.S.C. §§120 and 121 and claims the benefits of prior application Ser. No. 09/518,170 filed Mar. 2, 2000, now U.S. Pat. No. 6,390,241, which is hereby incorporated by reference in its entirety.

FIELD OF THE INVENTION

The invention relates to lubricating machines for lubricating an o-ring on a fuel injector.

BACKGROUND OF THE INVENTION

After manufacture, fuel injectors are tested on a test line to ensure that they have been properly manufactured. Prior to leak testing, a manual spraying of a test fluid onto the top of an injector o-ring lubricates the o-ring. However, some of the lubricating fluid tends to drain through orifice openings in the injector, contaminating the injector. Additionally, a typical prior art spraying device is a manual sprayer, requiring manual labor to apply the test fluid to the o-ring. Since the test fluid is applied in a spray, volatile organic compound emissions would be generated, causing potential health hazards to the person applying the spray.

Due to the manual nature of lubricating the o-ring and the physical mess generated by the spray, not every injector is sprayed prior to leak testing. This lack of lubrication allows some injectors to give false failure readings from the test stand, resulting in good injectors being discarded.

It would be beneficial to develop an apparatus for which automatically lubricates the o-ring on each injector without the need for manual application and which does not contaminate the interior of the injector with lubricating oil.

SUMMARY OF THE INVENTION

The present invention is an apparatus for lubricating a surface. The apparatus comprises a cylinder having an interior wall extending longitudinally therethrough. The wall defines an opening. The apparatus also comprises a lubricating fluid reservoir located upstream from the opening and at least one path communicating the reservoir and the opening. The apparatus also includes a valve located in the at least one path. The valve is operable between a closed position and an open position. The valve is biased to the closed position to close the path. At least one valve opening member is disposed in the opening. The at least one valve opening member is operatively connected to the valve to bias the valve to the open position.

The present invention is also a method of lubricating a surface comprising the steps of inserting a lubricating apparatus over a surface to be lubricated, the surface to be lubricated engaging at least one valve opening member disposed in an interior wall of the lubricating apparatus, the at least one valve opening member opening a valve in the lubricating apparatus; and allowing lubricating fluid in the lubricating apparatus to discharge past the valve and the at least one valve opening member to the surface to be lubricated.

The present invention is also an apparatus which comprises a cylinder having an interior wall extending longitudinally therethrough. The wall defines an opening. The apparatus also comprises a lubricating fluid reservoir located upstream from the opening and at least one path communicating the reservoir and the opening. The apparatus also includes a valve located in the at least one path. The valve is operable between a closed position and an open position. The valve is biased to the closed position to close the path. At least one valve opening member is disposed in the opening. The at least one valve opening member is operatively connected to the valve to bias the valve to the open position. A surface to be lubricated is insertable, into the opening such that the surface engages the at least one valve opening member. The at least one valve opening member opens the valve, allowing the fluid to flow downstream from the reservoir, through the path of fluid communication and to the opening to the surface to be lubricated.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain the features of the invention. In the drawings.

DETAILED DESCRIPTION OF THE PREFERRED EMBODIMENT

Figure 1:
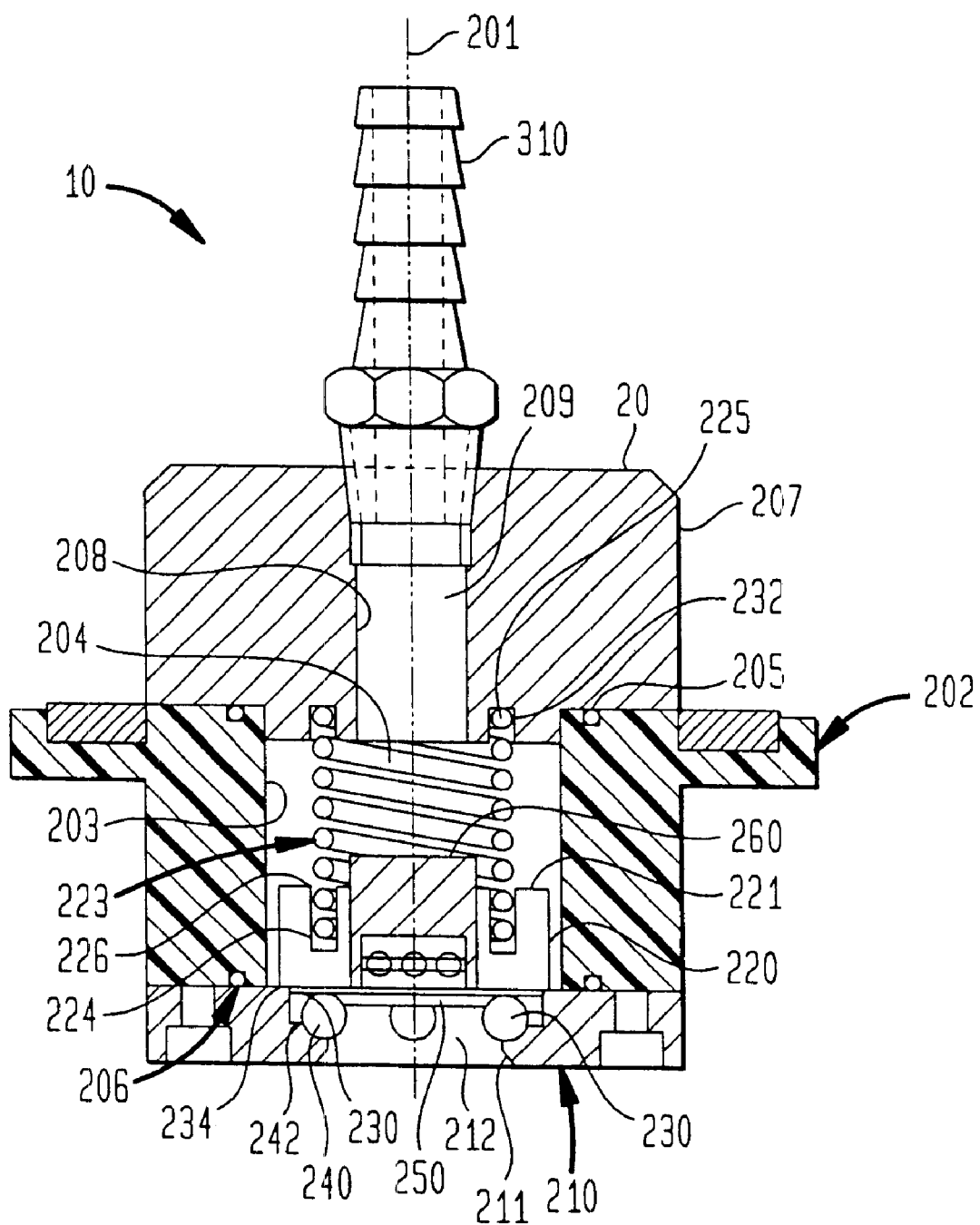
FIG. 1 is a side view, in section, of an o-ring oiler in a closed position according to a preferred embodiment.
Figure 2:
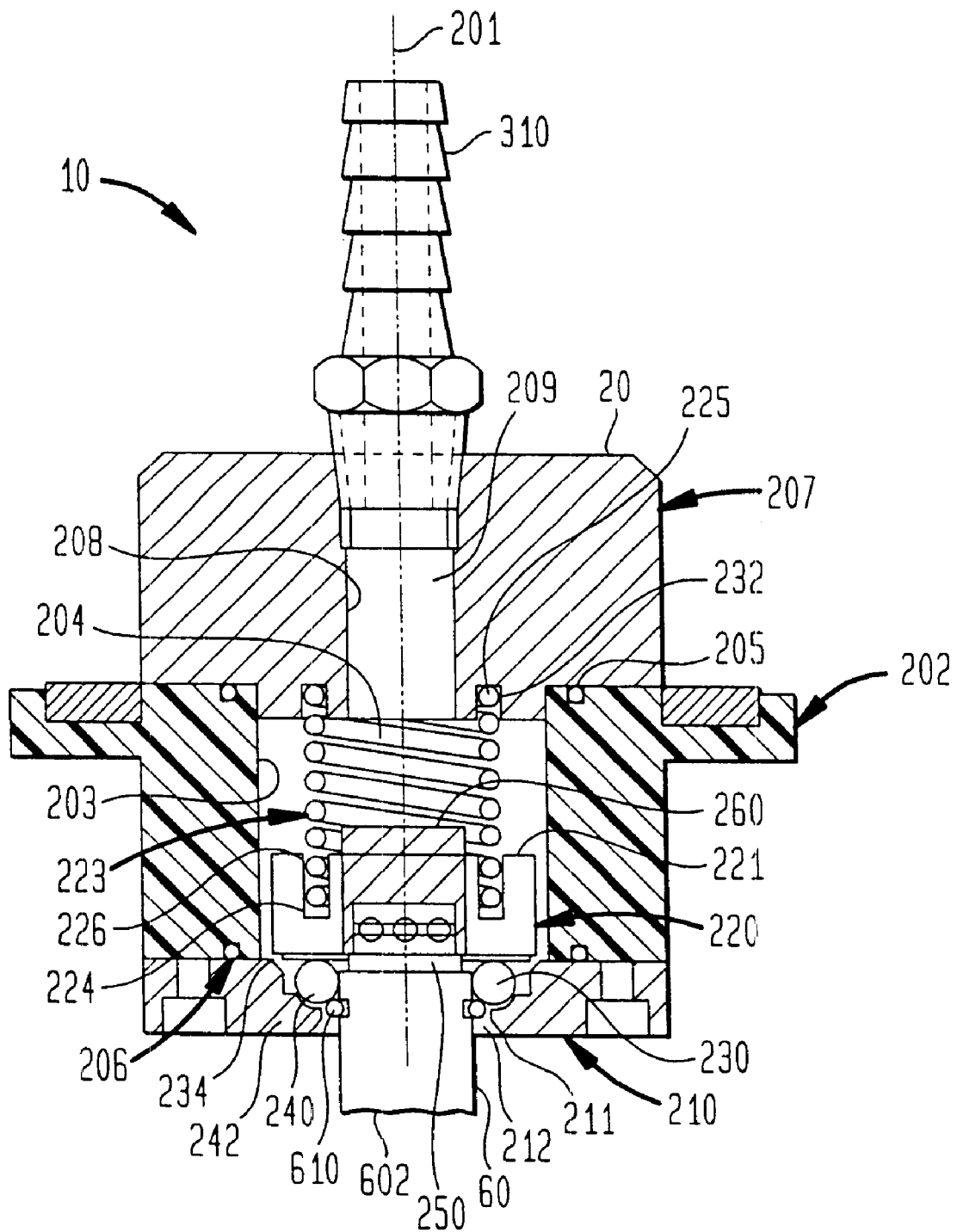
FIG. 2 is a side view, in section, of the o-ring oiler in an open position according to the preferred embodiment.
Figure 3:
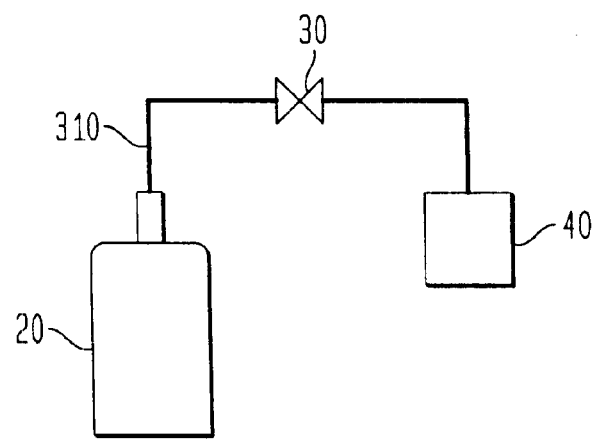
FIG. 3 is a schematic view of the oil supply of the o-ring oiler.

In the drawings, like numerals are used to indicate like elements throughout. An oiler 10 according to the preferred embodiment is shown in FIGS. 1–3. The oiler 10 is used to lubricate an o-ring 610 on a fuel injector 60 prior to inserting the injector 60 in a test stand (not shown). The oiler 10 includes a head 20, a solenoid 30 which regulates flow of lubricating fluid to the head 20, and an oil supply pot 40 which retains lubricating fluid in a reservoir under pressure, preferably between 0.5 and 1.5 pounds per square inch (psi). The pot 40 is fluidly connected to the head 20. Referring to FIG. 1, the head 20 includes a longitudinal centerline 201, a generally cylindrical body 202, a generally cylindrical cap 207 which is disposed upstream off the body 202, and a generally cylindrical applicator 210 which is disposed downstream of the body 202. As used herein, the term "upstream" is defined to mean "toward the top of the figure being referenced" and "downstream" is defined to mean "toward the bottom of the figure being referenced".

The body 202 has an interior wall 203 which extends longitudinally therethrough such that the entire wall 203 defines a generally tubular body opening or channel 204. The cap 207 has an interior wall 208 which extends longitudinally therethrough such that the entire wall 208 defines a generally tubular cap opening or channel 209. A downstream end of the cap 207 includes a generally annular channel 232 for reasons that will be explained. The applicator 210 has an interior wall 211 which extends longitudinally therethrough such that the entire wall 211 defines a generally tubular applicator opening or channel 212. An upstream end of the applicator 210 includes a beveled generally annular seat 234 for reasons that will be explained. The body and cap channels and 209 are generally centered on the longitudinal axis 201 and are in fluid communication with each other and with the pot 40. The applicator channel 212 fluidly communicates with the body channel 204 via a plurality of channels 240 which will be described in more detail later herein. An o-ring seal 205 seals the connection between the body 202 and the cap 207, and an o-ring 206 seals the connection between the body 202 and the applicator 210.

A valve or seal 220 is disposed within the body channel 204. The seal 220 has an upstream end 221 and a downstream end 222. The upstream end 221 includes a generally annular channel 226. The seal 220 is biased toward a closed position against the seat 234 by a biasing means 223. The downstream end 222 of the seal 220 is beveled to match the beveled surface on the seat 234. In a closed position, the seal 220 closes a path of fluid communication between the pot 40 and the applicator channel 212.

A downstream end 224 of the biasing means 223 is inserted into the channel 226. An upstream end 225 of the biasing means 223 is inserted into the channel 232 in the cap 207. Preferably, the biasing means 223 is a helical spring, although those skilled in the art will recognize that other biasing means can be used. A guide 260 is located in the body channel 204 and guides the seal 220 to the seat 234 when the biasing means 223 biases the seal 220 against The applicator 210 also includes a plurality of paths or channels 240 which fluidly communicate the downstream end 222 of the seal 220 with the applicator channel 212 in the applicator 210. An intersection of each of the channels 240 with the applicator channel 212 defines a lubricating area. Preferably, four channels 240 are located in the applicator 210 and are evenly spaced about the longitudinal axis 201. A valve opening member, preferably a sphere or a ball bearing 230, is rollingly located within each channel 240 and is operatively connected to the seal 220. Each ball bearing 230 engages the downstream end 222 of the seal 220 and a ramp 240 in the channel 242. The ramp 240 extends generally downstream and toward the longitudinal axis 201 as shown in FIGS. 1 and 2. A portion of each ball bearing 230 extends into the applicator channel 212 for reasons that will be explained. A thrust bearing 250 is located at an upstream end of the applicator channel 212, and is connected to the downstream side of the body 202. The thrust bearing 250 accepts any thrust transmitted to the head 20 from the injector 60 when the head 20 is lowered onto the injector 60 as will be discussed later in detail herein.

Preferably, the applicator 210 and the seal 220 are constructed from a polymer, and more preferably, from white Delrin, and the ball bearings 230 are constructed from stainless steel, although those skilled in the art will recognize that the applicator 210, the seal 220, and the ball bearings 230 can be constructed from other suitable material as well.

Referring to FIG. 3, an oil supply line 310 fluidly connects the oil supply pot 40 to the oil inlet of the cap 207. The solenoid valve 30 is located along the supply line 310 for alternately supplying and securing oil through the supply line 310 to the head 20 from the oil supply pot 40.

Figure 5:
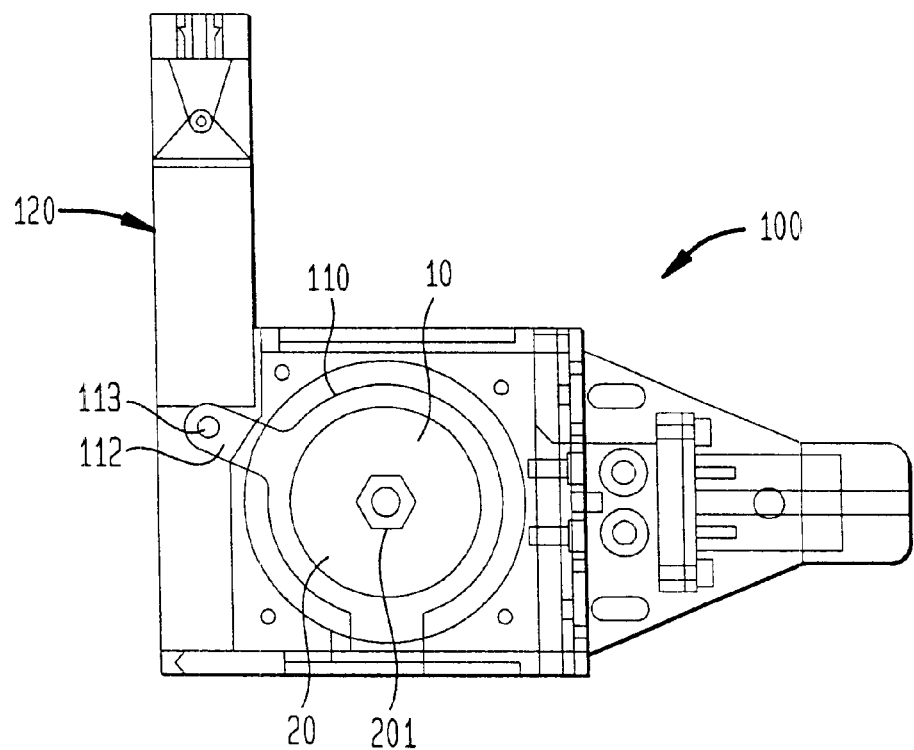
FIG. 5 is a top plan view of the o-ring oiler assembly taken along line 5—5 of FIG. 4.
Figure 4:
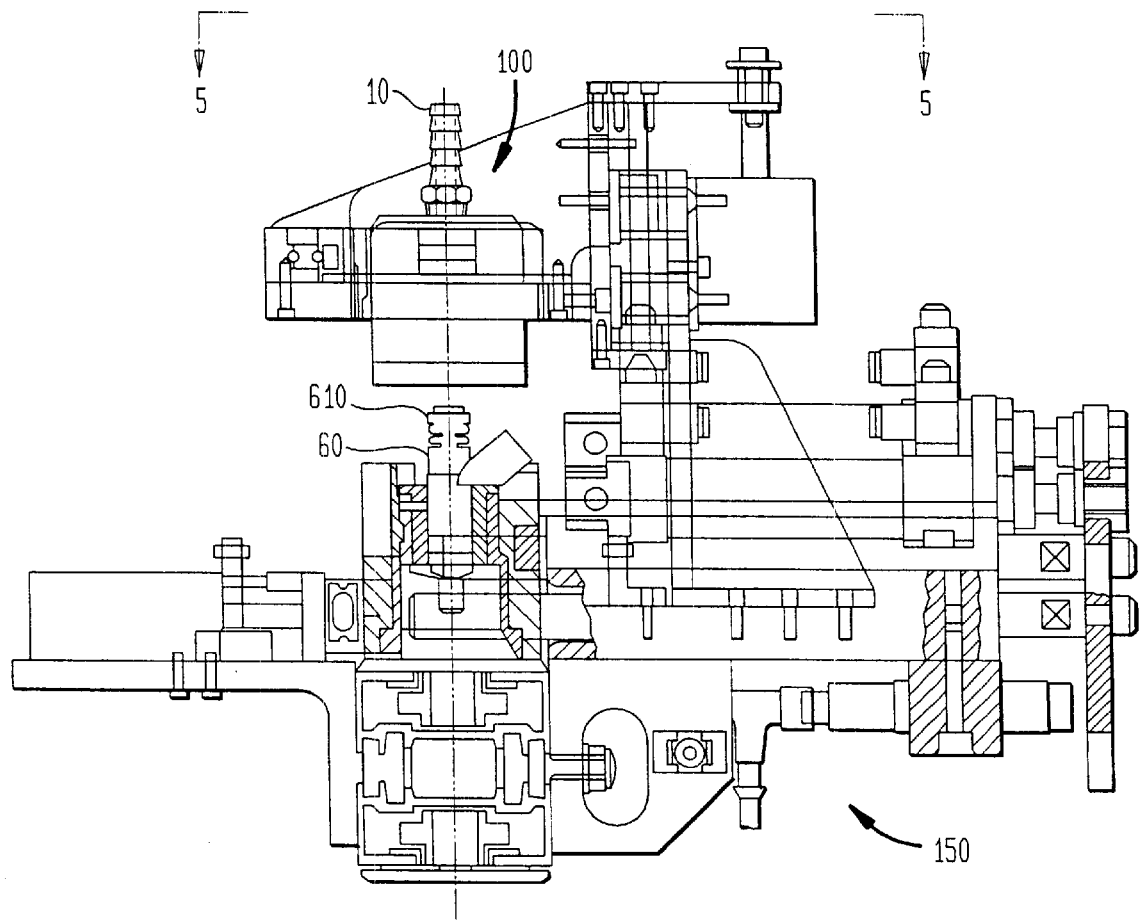
FIG. 4 is a side view of an o-ring oiler assembly according to the preferred embodiment.

A side view of the oiler assembly 100 and oiler station 150 is shown in FIG. 4 and a top plan view of the oiler assembly 100 alone is shown in FIG. 5. The oiler assembly 100 includes an apparatus for rotating the head 20 approximately 90 degrees about the longitudinal axis 201. Referring to FIG. 5, the oiler assembly 100 includes a clamp 110 which engages the outer diameter of the body 202. An extension arm 112 extends outward from the clamp 110 away from the longitudinal axis 201. A distal end 113 of the extension arm 112 is pivotally connected to an actuating end of an air cylinder 120.

Operation of the air cylinder 120 rotates the extension arm 112 (counter-clockwise in FIG. 5), and therefore the clamp 110 and the oiler 10, approximately 90 degrees about the longitudinal axis 201. However, those skilled in the art will recognize that the air cylinder 120 can rotate the extension arm 112, the clamp 110, and the oiler 10 through an angle of less than or greater than 90 degrees as will be discussed later herein.

FIG. 4 shows a side view of the oiler assembly 100 posed over top of the injector oiler station 150 with an injector 60 inserted therein. An input end 602 of the injector 60 faces the head 20.

In operation, the oiler assembly 100 is pressurized with lubricating fluid from the oil supply pot 40. Lubricating oil in the oil supply pot 40 is at a pressure of between 0.5 and 1.5 psi through the supply line 310. The solenoid valve 30 is opened, allowing the pressurized lubricating oil to continue through the supply line 310 to the head 20. The lubricating oil enters the cap channel 209 and the body channel 204. The ball bearings 230 are biased toward the lower end of each respective ramp 240. The spring 223 biases the seal 220 to a closed position, preventing the lubricating fluid from flowing through the channels 242.

The oiler assembly 100 is then posed over the injector 60 to be oiled in the injector oiler station 150. The oiler assembly 100 is lowered onto the input end 602 of the injector 60 so that the o-ring 610 of the injector 60 engages the ball bearings 230. The top of the injector 60 engages the thrust bearing 250.

As the head 20 is further lowered onto the injector 60, the o-ring 610 engages the ball bearings 230 and pushes the ball bearings 230 upward and away from the longitudinal axis 201, as shown in FIG. 2. The ball bearings 230 ride up the ramp 240 and overcome the biasing force of the spring 223, lifting the seal 220 from its seat 234. A path of fluid communication is opened between the body channel 204 and the applicator channel 212 through the channels 242, allowing the lubricating fluid to flow past the seal 220 and the ball bearings 230, to the lubricating area and the o-ring 610 for lubrication.

Since the ball bearings 230 are located in four discrete locations around the o-ring 610, the head 20 must be rotated relative to the o-ring 610 in order to lubricate the entire perimeter of the o-ring 610. To that end, the air cylinder 120 is activated, rotating the clamp 110 and the head 20 approximately 90 degrees about the longitudinal axis 201 in order to lubricate the entire perimeter of the o-ring 610. Those skilled in the art will recognize that, in order to lubricate the o-ring 610 about its entire circumference, the head 20 must be rotated in angular distance that is functionally related to the number of ball bearings 230 in the head 20. Preferably, when the ball bearing 230 are evenly spaced, the head 20 is rotated according to the equation:

$$R° = 360°/n$$

where:

R equals the angular rotation of the head 20; and n equals the number of ball bearings 230 in the head 20.

After the head 20 has been rotated to lubricate the o-ring 610, the oiler assembly 10 automatically lifts from the injector 60. As the o-ring 610 is removed from the ball bearings 230, the spring 223 forces to the seal 220 onto its seat 234, closing the flow of lubricating fluid from the head 20 to the o-ring 610. The ball bearings 230 are forced by the downstream end 222 of the seal 220 down the ramp 240. The lubricated injector 60 is then released from the injector oiler station 150 and passed to an injector test stand (not shown). After oiling, the injector 60 is released from the injector oiler station 150 and another injector 60 is inserted into the oiler station 150. The process is repeated as required.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the attached claims.

What is claimed is:

1. A method of lubricating a surface of a fuel injector comprising the steps of:

inserting a lubricating apparatus over a surface to be lubricated, the surface to be lubricated engaging at least one valve opening member disposed in an interior wall of the lubricating apparatus, the at least one valve opening member opening a valve in the lubricating apparatus; and allowing lubricating fluid in the lubricating apparatus to discharge past the valve and the at least one valve opening member to the surface to be lubricated.

2. The method according to claim 1, further including, after allowing lubricating fluid in the lubricating apparatus to discharge past the valve and the at least one valve opening member to the surface to be lubricated, the step of rotating the apparatus about a longitudinal axis to lubricate a perimeter of the surface to be lubricated.

3. The method according to claim 1, wherein the surface to be lubricated engages a plurality of valve opening members, the plurality of valve opening members opening the valve.

4. The method according to claim 3, wherein the step of rotating the apparatus about the longitudinal axis follows the equation:

$$R \text{ equals } 360 \text{ degrees}/n$$

where "R" equals the angular rotation of the apparatus and "n" equals the number of valve opening members in the apparatus.

5. A method of lubricating an o-ring disposed about a device, the device extending along a longitudinal axis, the device having an exterior surface and at least an opening in communication with an interior volume of the device, the method comprising:

coupling the device to a lubricating apparatus, the lubricating apparatus being in fluid communication with a source of lubricant; and moving a valve opening member along a guide member of the lubricating apparatus from a first position to a second position so as to discharge lubricating oil on at least a portion of the o-ring.

6. The method of claim 5, further including:

forming a seal between the at least one opening of the device and the guide member prior to the moving of the valve opening member.

7. The method of claim 6, further including rotating one of the device and the lubricating apparatus at a plurality of angular rotations about the longitudinal axis.

8. The method of claim 7, wherein the device includes a fuel injector.

9. The method of claim 6, wherein the forming of a seal further includes engaging a portion of the guide member to an interior surface of the lubricating apparatus prior to the moving of the valve opening member.

10. The method of claim 5, wherein the valve opening member includes a plurality of ball bearings disposed about the longitudinal axis.

11. The method of claim 5, wherein the guide member includes a thrust bearing disposed for engagement with an opening of the device.

\* \* \* \* \*